United States Patent
Omata et al.

[11] Patent Number: 5,877,809
[45] Date of Patent: Mar. 2, 1999

[54] METHOD OF AUTOMATIC OBJECT DETECTION IN IMAGE

[75] Inventors: Kyoichi Omata, Tanashi; Toshiki Miyano, Yokohama; Manabu Kiri, Machida, all of Japan

[73] Assignee: Eastman Kodak Company, Rochester, N.Y.

[21] Appl. No.: 731,637

[22] Filed: Oct. 15, 1996

[30] Foreign Application Priority Data

Apr. 15, 1996 [JP] Japan .................................. 8-092497

[51] Int. Cl.⁶ .......................... G03B 13/00; G03B 17/00
[52] U.S. Cl. ......................... 348/345; 348/350; 348/354; 396/80
[58] Field of Search .................... 348/345, 348, 348/349, 350, 353, 354, 355, 356, 169, 170

[56] References Cited

U.S. PATENT DOCUMENTS

| | | | |
|---|---|---|---|
| 4,853,788 | 8/1989 | Murashima et al. .................... | 348/356 |
| 5,249,058 | 9/1993 | Murata et al. .......................... | 348/354 |
| 5,512,951 | 4/1996 | Torii ....................................... | 348/353 |
| 5,539,462 | 7/1996 | Lee et al. ................................ | 348/349 |
| 5,561,497 | 10/1996 | Muramatsu et al. ................... | 396/121 |
| 5,638,122 | 6/1997 | Kawaguchi et al. ................... | 348/349 |
| 5,715,483 | 2/1998 | Omata et al. ........................... | 396/80 |

*Primary Examiner*—Andrew I. Faile
*Assistant Examiner*—Luong Nguyen
*Attorney, Agent, or Firm*—David M. Woods

[57] ABSTRACT

An image is divided into a plurality of subdivision areas. A focus evaluation value representative of the high frequency component contained in the electrical signal from the CCD is calculated for each of the subdivision areas. The object distance is calculated for the respective subdivision areas based on the focus evaluation value. A target object is extracted based on the calculated object distance. The target object is focused. During the focusing operation, when a new object having an object distance smaller than that of the target object is detected in any of remote subdivision areas which have an object distance larger than that of the target object, the target object is re-selected.

6 Claims, 8 Drawing Sheets

G(3.4) — INFINITE

METHOD OF AUTOMATIC OBJECT DETECTION IN IMAGE

FIELD OF THE INVENTION

The present invention relates to a method of automatic object detection in an image employed in imaging devices with automatic focusing such as electronic still cameras capable of keeping in focus target objects with a focusing lens. Particularly, a method is employed in imaging devices comprising a photoelectric detector for converting an image formed through a focusing lens into an electrical signal corresponding to the illuminance of the image, a focusing mechanism for calculating a focus evaluation value representative of the high frequency component contained in the electrical signal so as to establish a focus on the image by moving the focusing lens on the basis of the focus evaluation value.

BACKGROUND OF THE INVENTION

For example, when an imaging device such as a camera with automatic focusing attempts to continuously focus a target object with a focusing lens, movement of the target object within an image or a scene change in an image should at once be detected to determine the position of the target object within the image. On the other hand, when focus on a target object can be maintained without re-selection of the target object, the processing of re-selecting the target object or re-focusing the target object may make an operator feel uncomfortable.

The conventional camera is proposed to employ a method of automatic object detection in an image by detecting the variation in brightness within the image. The proposed method cannot detect a scene change with a small variation in brightness when the scene changes in response to panning the camera by an operator. The camera accordingly cannot keep in focus the target object.

The conventional camera, once focus is achieved, fixes a lens position of the focusing lens so as to detect a scene change on the basis of the variation in a brightness and a focus evaluation value. When a threshold value is set to the variation in brightness and focus evaluation values for avoiding any erroneous detection of a scene change through fine movement of a target object, the camera sometimes cannot detect a scene change in which a new small object appears in front of the focused target object, since the variation in the brightness and focus evaluation values is small.

Further, the conventional camera fixes a lens position of the focusing lens once a focus is achieved, so that the camera detects a scene change so as to re-select the target object when the focused target object moves back and forth. In this case, the position of the target object within the image is maintained so that a focus can be achieved at the same position. Accordingly, the overall process of re-selecting the target object may waste time. It is preferable to cope with back and forth movement of the target object by simply moving the focusing lens to a lens position allowing the maximum focus evaluation value without re-selection of the object.

SUMMARY OF THE INVENTION

An object of the present invention is accordingly to provide a method of automatic object detection capable of keeping focusing a target object by reliably detecting a scene change in an image without any particular hardware.

According to the present invention, there is provided a method of automatic object detection comprising: obtaining an electrical signal corresponding to an illuminance of an image formed through a focusing lens with a photoelectric detector; dividing the image into a plurality of subdivision areas; calculating for each of the subdivision areas a focus evaluation value representative of a high frequency component contained in the electrical signal; calculating an object distance for each of the subdivision areas based on the focus evaluation value so as to select a target object based on the object distance; focusing the target object by moving the focusing lens; and re-selecting the target object to be focused when a new object having an object distance smaller than the object distance of the target object is detected in a remote subdivision area having an object distance greater than the object distance of the target object during said focusing.

When the focusing lens is moved toward an infinite point so as to establish a lens position allowing a maximum focus evaluation value in an object subdivision area to which the target object belongs, detection of a reduction in the focus evaluation value in any of the remote subdivision area before a reduction in the focus evaluation value is detected in the object subdivision area may cause the target object to be re-selected.

When the focusing lens is moved toward a nearest point so as to establish a lens position allowing a maximum focus evaluation value in an object subdivision area to which the target object belongs, detection of a reduction in the focus evaluation value in the object subdivision area and of an increase in the focus evaluation value by a predetermined amount or more in any of the remote subdivision area may cause the target object to be re-selected.

With any of the above arrangements, a scene change can be reliably detected as compared with the case where the target object is re-selected based on only the brightness value. The target object is continuously focused at all times.

If said predetermined amount is determined on the basis of the maximum focus evaluation value obtained for each of the subdivision areas when calculating the object distance for the respective subdivision areas, an object movement can be detected depending upon the object contrast for the respective subdivision areas.

The method may further comprise: moving the focusing lens back and forth when the target object is focused; confirming the maximum focus evaluation value in the object subdivision area in response to movement of the focusing lens; and re-selecting the target object to be focused when a new object having an object distance smaller than the object distance of the target object is detected in any of the remote subdivision during the movement of the focusing lens.

With this arrangement, even if a back and forth movement of the target object causes a scene change to be detected, a focus on the image can be established by quick processing such as tracking of the focusing lens, without an overall scanning operation from the beginning.

In addition, the method may further comprise: weighting an object subdivision area to which a target object belongs, an equal distance subdivision area having the object distance equal to that of the target object, and a disparate subdivision area having an object distance different from that of the target object; calculating sum of brightness values and focus evaluation values for the respective subdivision areas while fixing a lens position; moving the focusing lens to a lens position allowing a maximum focus evaluation value when variation in the focus evaluation value for the object subdivision area remains in a predetermined region and variation in the sum of the brightness values is a predetermined threshold or less; and re-selecting the target object to be focused when variation in the sum of the brightness values is more than the predetermined threshold or when the sum of the focus evaluation values is a predetermined value or more.

With this arrangement, a small scene change can be detected and the back and forth movement of the target object can be tracked.

BRIEF DESCRIPTION OF THE DRAWINGS

The above and other objects, features and advantages will be apparent from the following detailed description taken in conjunction with the accompanying drawings, wherein.

DESCRIPTION OF THE PREFERRED EMBODIMENT

Figure 1:
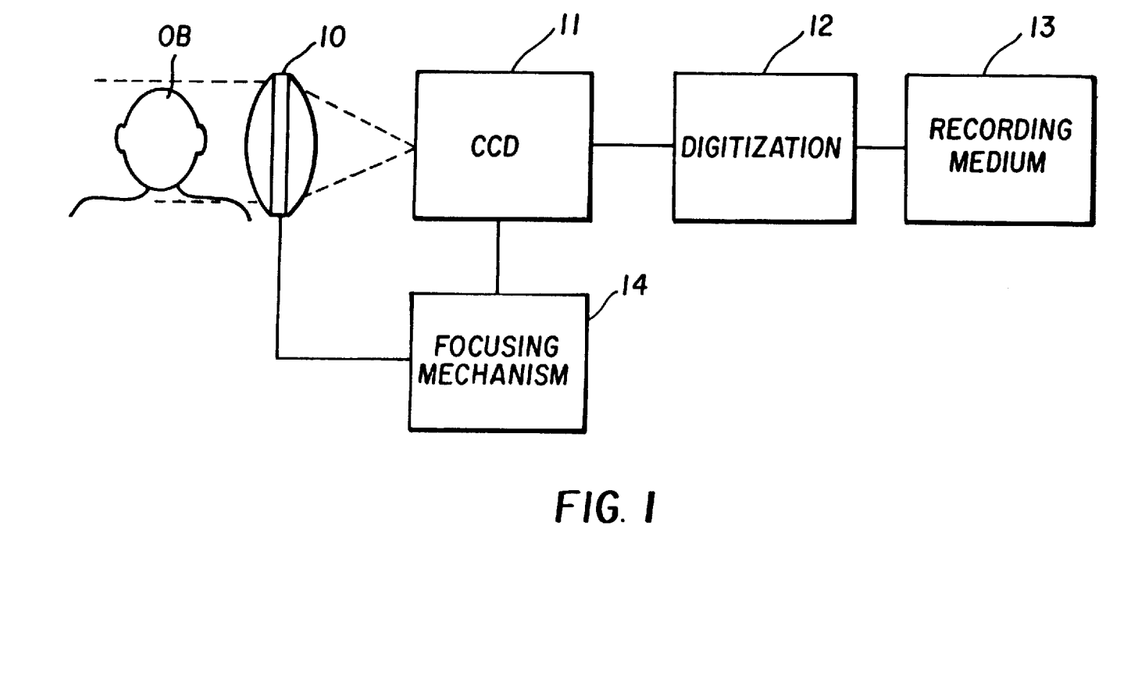
FIG. 1 illustrates an overall structure of an electronic still camera according to the present invention.

FIG. 1 illustrates a schematic overall structure of an imaging device with automatic focusing. An electronic still camera SC as the imaging device comprises a focusing lens 10 for capturing a target object OB at an appropriate lens position, and a CCD (charge coupled device) 11 as a photoelectric detector for converting an image formed through the focusing lens 10 into an electrical signal corresponding to the illuminance of the image. The image captured by the CCD 11 is digitized, for example by an A/D converter 12, and is recorded in a recording medium 13 such as a memory card.

Figure 2:
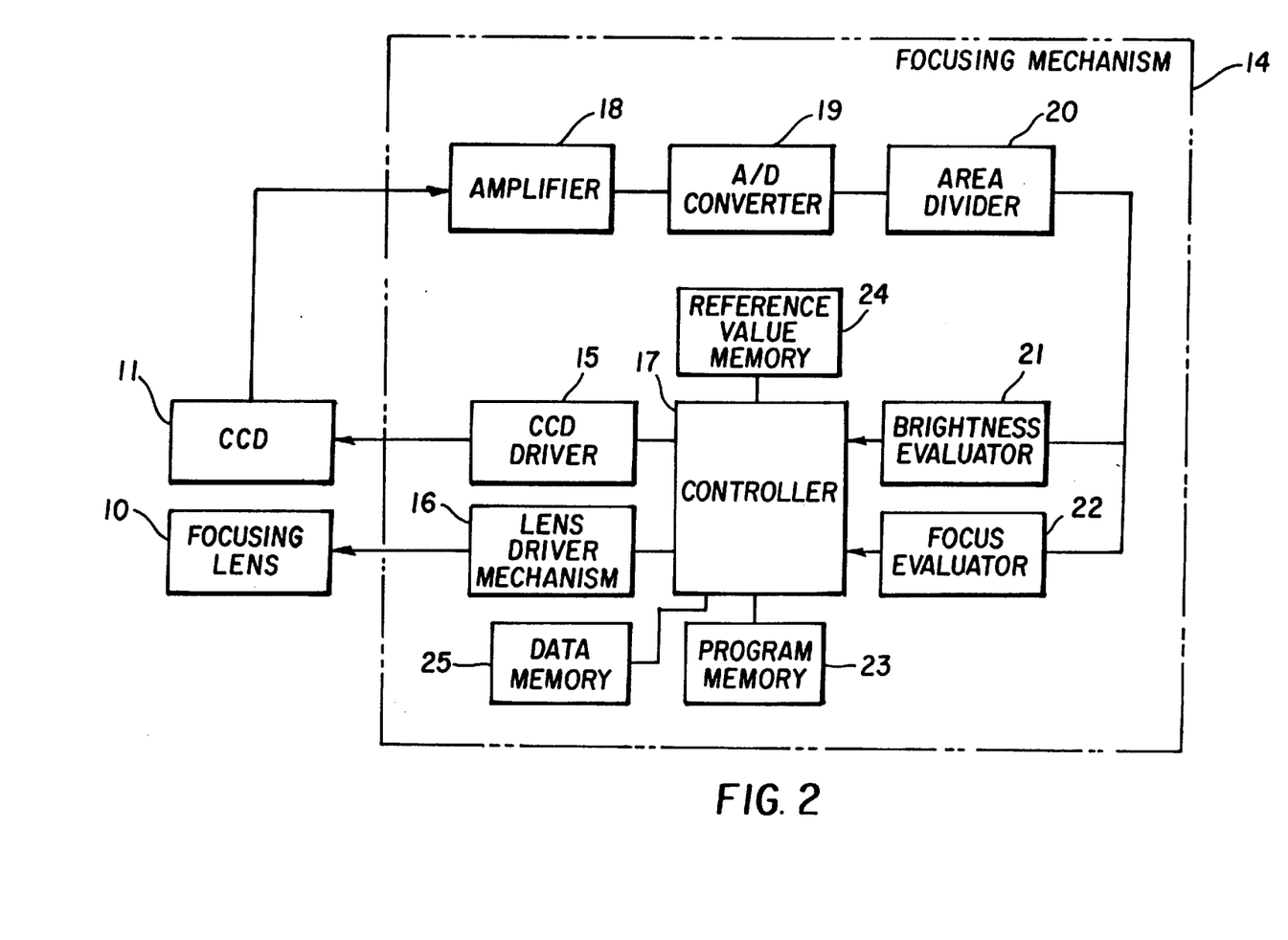
FIG. 2 is a block diagram illustrating a focusing mechanism.

A focusing mechanism 14 serves to focus the image with the focusing lens 10. As shown in FIG. 2, the focusing mechanism 14 comprises a CCD driver 15 for supplying a drive signal to the CCD 11, a lens driver mechanism 16 for moving the focusing lens 10 back and forth along its optical axis, and a controller 17 for controlling the CCD driver 15 and the lens driver mechanism 16. Under control of the controller 17, a serial signal sequence corresponding to the illuminance of each pixel in the image is output from the CCD 11 in response to a drive signal from the CCD driver 15.

The signal sequence from the CCD 11 is amplified by an amplifier 18. The amplified electrical signal is linearly converted into a digital signal by an A/D converter 19. An area divider 20 divides the image into a plurality of subdivision areas and outputs the digital signal for the respective subdivision areas. The output digital signal is supplied to a brightness evaluator 21 and a focus evaluator 22. The brightness evaluator 21 calculates a brightness value representative of the brightness of the image for each of the subdivision areas on the basis of the supplied digital signal. The focus evaluator 22 calculates a focus evaluation value representative of the high frequency component contained in the electrical signal for each of the subdivision areas on the basis of the supplied digital signal. The focus evaluation value can be obtained by summing the high frequency component for each pixels within a subdivision area. The controller 17 assume a focus of the focusing lens 10 at a lens position allowing the maximum focus evaluation value. The assumption of a focus utilizes the fact that the high frequency component of an electrical signal from the CCD 11 is larger for an in-focus image than for an out-of-focus image.

The controller 17 processes the supplied focus evaluation and brightness values in accordance with a program stored in a program memory 23. A reference value memory 24 is connected to the controller 17 for storing a focus evaluation and a brightness value for an in-focus image as reference values while a data memory 25 is connected to the controller 17 for storing various calculated data. It should be noted that a single memory device can be commonly employed in place of the separate program, reference value, and data memories 23, 24, 25.

Figure 3:
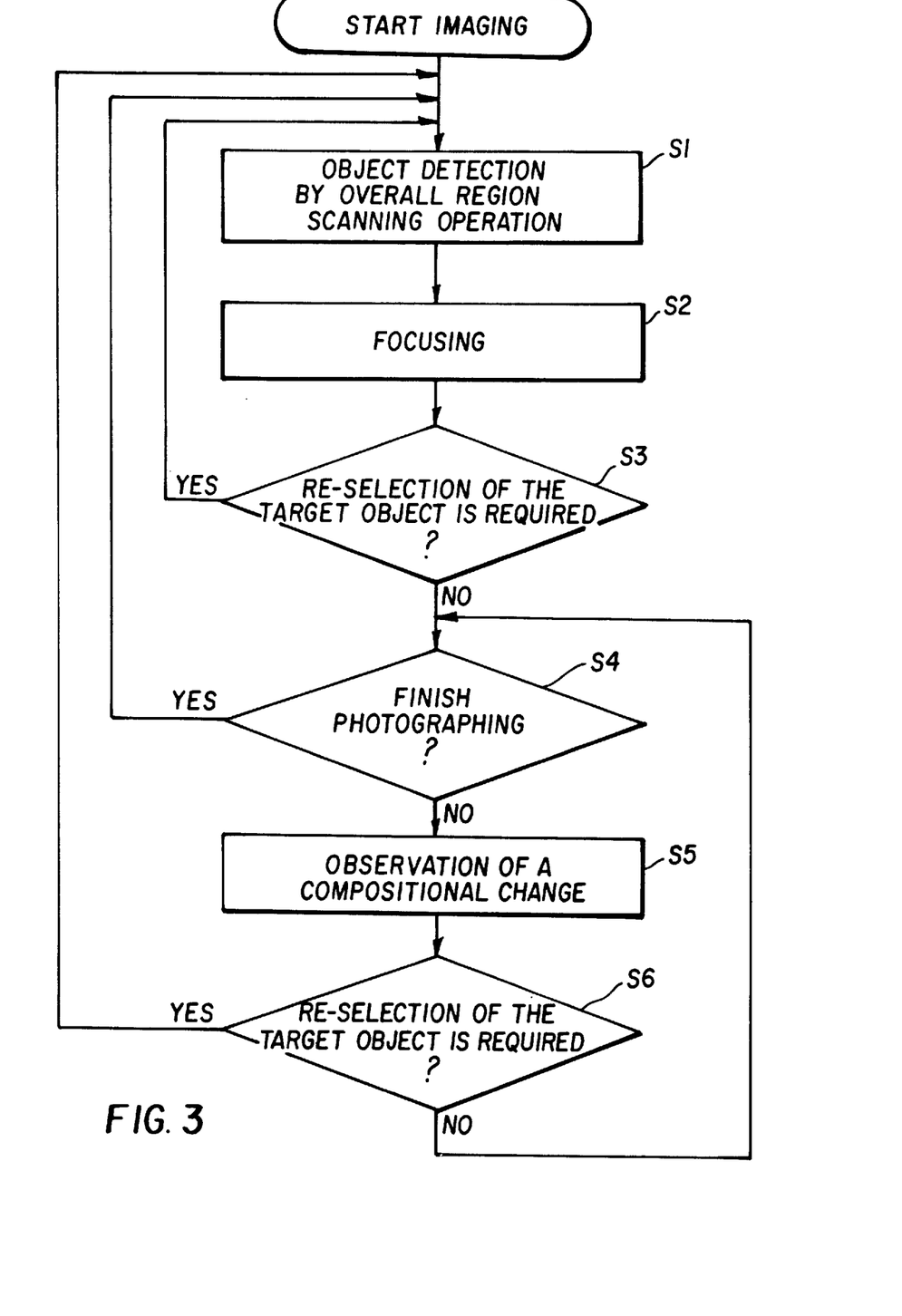
FIG. 3 is a flowchart for explaining an imaging operation.

Referring to the flowchart shown in FIG. 3, the method according to the present invention will next be described. When an image pick-up is started, an initial object detection is conducted through an overall region scanning operation at the first step Si. The overall region scanning operation causes the focusing lens 10 to move from the nearest point to the infinite point at least once. During the movement of the focusing lens 10, a target object is extracted from the composition of an image. The extracted target object is focused at the second step S2, During the focusing operation, it is determined whether or not re-selection of the target object is required. If it is determined at the third step S3 that it is not necessary to re-select the target object with a focus maintained on the object, processing proceeds to the fourth step S4, If an operator takes a photograph at the fourth step S4, the image is recorded in the recording medium 13 shown in FIG. 1. Thereafter, if an operator intends to take another photograph, the processing returns to the first step SI. Assuming that re-selection of the target object is determined to be necessary at the third step S3, the processing returns to the first step SI so as to re-select a target object.

After a focus is achieved, if an operator delays in taking a photograph, a scene change is observed at the fifth step S5. The observation serves to keep the focus on the target object by detecting a compositional change in the image such as displacement or attitude change of the target object. For example, displacement of the target object from the center to an edge of the image, exchange of target objects by introducing another object into the image, and movement of the target object back and forth along the optical axis of the focusing lens 10 at the center of the image can be simply detected.

If no compositional change is detected at the sixth step S6, the processing returns to the fourth step S4 to determine whether photographing is finished or not. Detection of a compositional change is repeatedly conducted until an operator finishes photographing. If a compositional change is detected at the sixth step S6, the processing returns to the first step SI.

Figure 4:
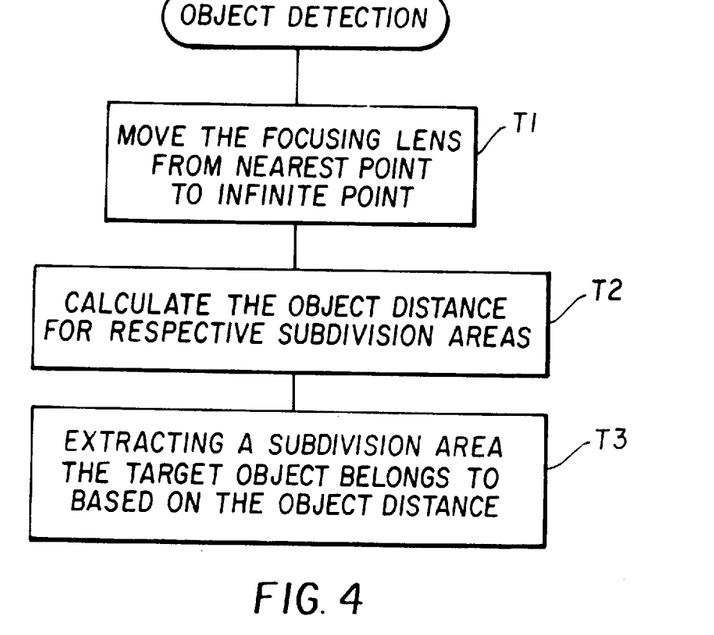
FIG. 4 is a flowchart for explaining the operation of an object detection.

Referring to FIG. 4, the operation of an overall region scanning will be next described in detail. In the first step T1, the controller 17 moves the focusing lens 10 at a constant velocity from the nearest point to the infinite point through the lens driver mechanism 16. During the movement of the focusing lens 10, the controller 17 causes the CCD 11 to repeatedly output an electrical signal corresponding to the illuminance of the image at preset intervals. The focus evaluator 22 calculates a focus evaluation value representative of the high frequency component of the output electrical signal. The brightness evaluator 21 likewise calculates a brightness value representative of the image brightness. The focus evaluation and brightness values can be obtained for each of the subdivision areas by means of the area divider 20. Specifically, the focus evaluation and brightness values of the respective subdivision areas can be obtained for a plurality of images along the time axis.

Figure 5:
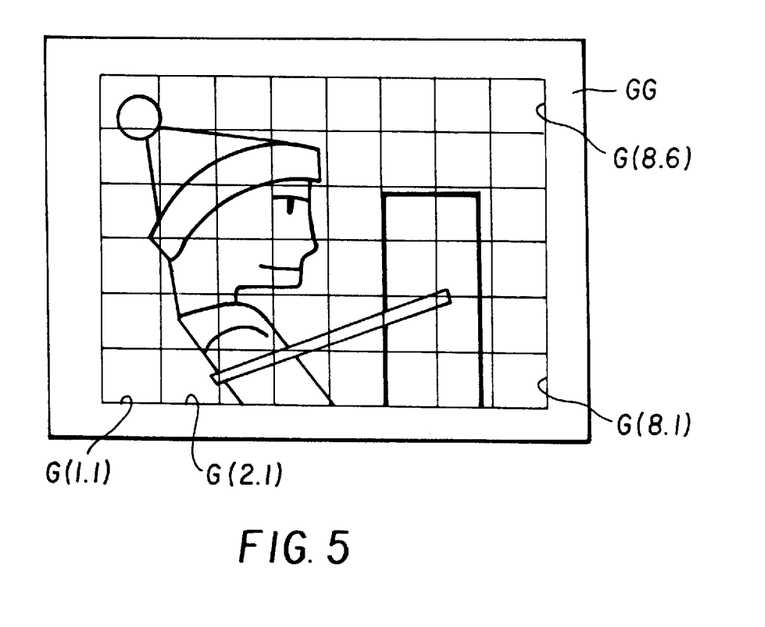
FIG. 5 illustrates one example of an image.
Figure 6:
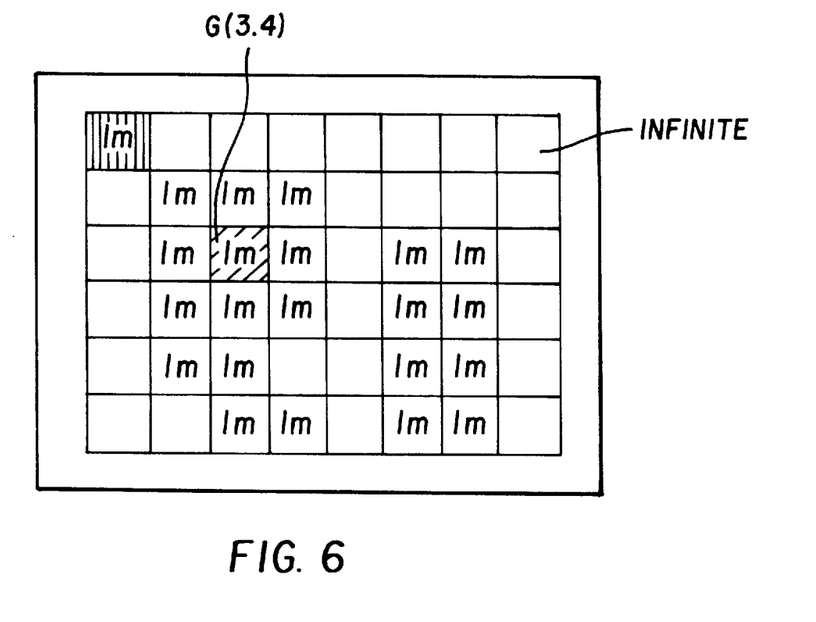
FIG. 6 illustrates the object distance for the respective subdivision areas.

The controller 17 calculates an object distance for each of the subdivision areas based on the detection of a focus at the second step T2, The controller 17 stores in the data memory 25 the lens position allowing the maximum focus evaluation value for each of the subdivision areas. For example, assume that an operator attempts to pick up an image in FIG. 5. The image GG is divided into a plurality of matrix-form subdivision areas G(1,1) to G(8,6) by the area divider 20. Object distance data in FIG. 6 is then obtained from distance calculation.

The controller 17 specifies at the third step T3, based on the object distance, an object subdivision area to which a target object belongs. The controller 17 first groups the subdivision areas with identical object distances. The result of grouping enables the controller 17 to extract as an object subdivision area the subdivision area G(3,4) surrounded by equal distance subdivision areas G(2,3) to G(4,5) which have the identical object distance.

Figure 7:
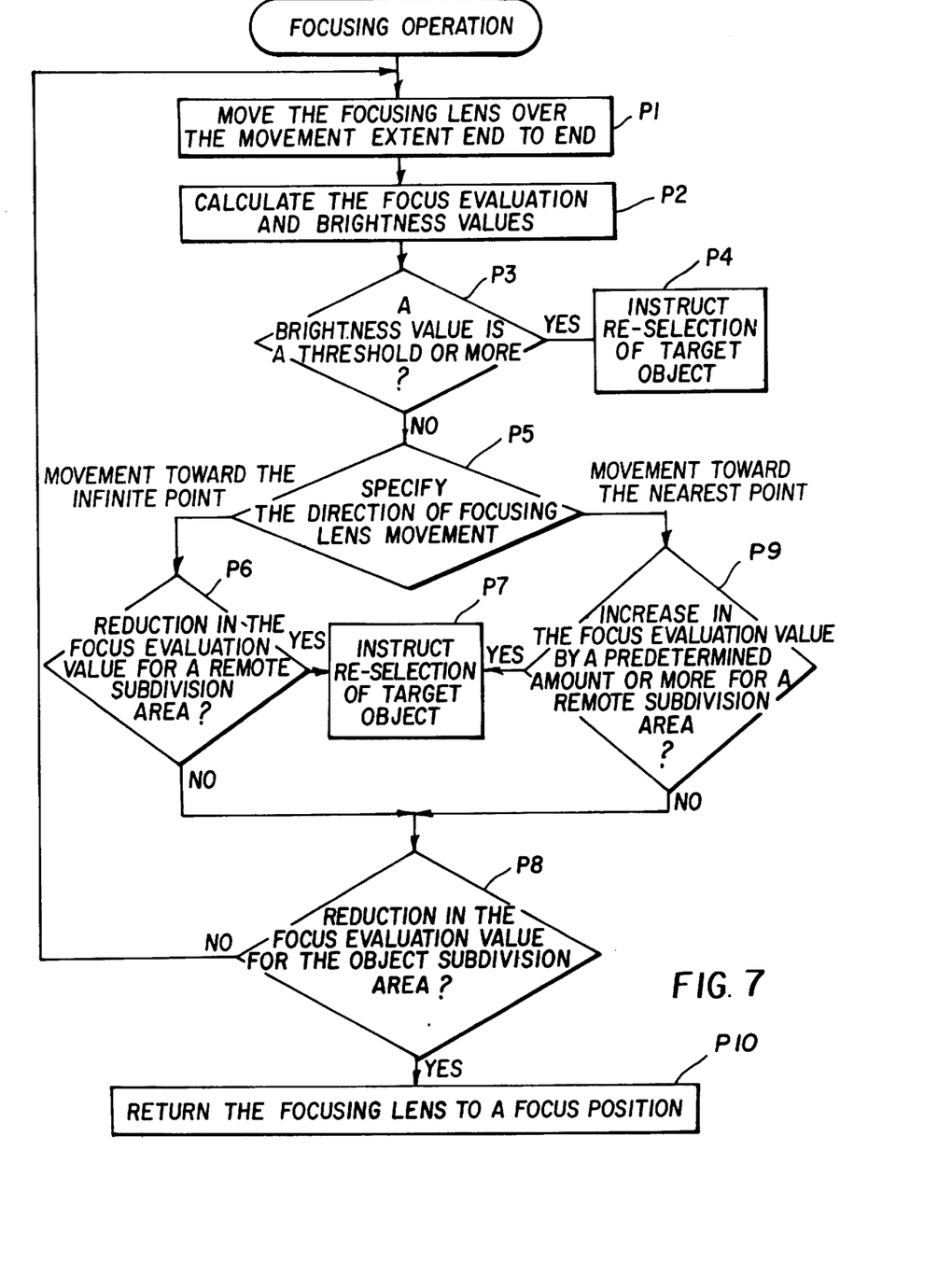
FIG. 7 is a flowchart for explaining a focusing operation.

Referring to FIG. 7, the focusing operation in the second step S2 in FIG. 3 will next be described in detail. The controller 17 moves at the first step P1, subsequent to the aforementioned overall region scanning operation, the focusing lens 10 from the nearest point to the infinite point or from the infinite point to the nearest point. During the movement of the focusing lens 10, the CCD 11 is caused to output an electrical signal so as to allow the focus evaluator 22 to output focus evaluation values and the brightness evaluator 21 to output brightness values at the second step P2. The focus evaluation value is increased in the object subdivision area G(3,4) until the focusing lens 10 establishes a focus on the target object.

At the third step P3, variation in brightness values in the respective subdivision areas G(x,y) is observed during the movement of the focusing lens 10. If it is determined that the variation in a brightness value is a threshold value or more, it is recognized that re-selection at the third step S3 in FIG. 3 is necessary at the fourth step P4, At the fifth step P5, it is determined whether the focusing lens 10 moves from the nearest point to the infinite point or moves from the infinite point to the nearest point, in other words, the direction of movement of the focusing lens 10 is specified. In case of movement toward the infinite point, detection of a reduction in the focus evaluation value in any of remote subdivision areas, which have the object distance greater than the target object, before a reduction in the focus evaluation value is detected in the object subdivision area at the sixth step P6 causes the recognition of need to re-select the target object at the third step S3 in FIG. 3 (the seventh step P7 in FIG. 7). No detection of a reduction in the focus evaluation value in any of the remote subdivision areas allows advancement to the eighth step P8, In case of movement toward the nearest point, detection of an increase in the focus evaluation value by a predetermined amount or more at the ninth step P9 causes the recognition of need to re-select the target object at the third step S3 in FIG. 3 (the seventh step P7 in FIG. 7). Detection of no increase in the focus evaluation value beyond the predetermined amount in any of the remote subdivision area allows advancement to the eighth step P8, At the eighth step P8, it is determined whether or not the focus evaluation value is decreased in the object subdivision area G(3,4). The decrease in the focus evaluation value mentions that the focusing lens 10 has passed over the lens position allowing the maximum focus evaluation value. No detection of decrease allows a determination that the focus evaluation value has not reached the maximum, so that processing returns to the first step Pl. The above processing is repeated until the focusing lens 10 passes over the lens position allowing the maximum focus evaluation value.

If the focusing lens 10 is determined to have passed over the lens position of the maximum focus evaluation value in the object subdivision area G(3,4) at the eighth step P8, the focusing lens 10 is returned to the lens position of the maximum focus evaluation value at the tenth step P9, A focus on a desired target object can be established as described above.

In the above processing, when a new object with an object distance smaller than that of the target object is detected, during the focusing operation in any of the remote subdivision areas having an object distance greater than that of the target object, the target object is re-selected. Therefore, a scene change in an image can be reliably detected as compared with the case where a target object is re-selected on the basis of brightness values only. It is possible to keep focus on the target object.

Referring to the flowchart in FIG. 8, the detecting operation of compositional changes in an image at the fifth step S5 in FIG. 3 will next be described in detail. The focusing lens 10 is finely vibrated back and forth along its optical axis at the first step Q1. The extent of the fine vibration is set equally back and forth of the lens position allowing the maximum focus evaluation value or lens position establishing a focus. During the fine vibration, the focus evaluation and brightness values are calculated at preset intervals at the second step Q2.

At the third step Q3, variation in the brightness values is observed for the respective subdivision areas G(x,y) during the movement of the focusing lens 10. If it is determined that the variation in the brightness value is a threshold or more, it is informed that the target object should be re-selected at the third step S3 in FIG. 3 (the fourth step Q4 in FIG. 8). A determination that the variation is less than the threshold allows determination at the fifth step Q5 whether or not the lens position allowing the maximum focus evaluation value is located at the center of the vibration. If this lens position is kept at the center, processing returns to the first step Q1.

If the lens position allowing the maximum focus evaluation value is determined to be apart from the center of the vibration, the focusing lens 10 is moved in a direction to increase the focus evaluation value at the sixth step Q6. During the movement of the focusing lens 10, the focus evaluation value is continuously observed at the seventh step Q7. If a new object having an object distance smaller than that of the target object is detected in any of the remote subdivision areas at the eighth step Q8, the target object is re-selected for focusing at the ninth step Q9. If re-selection is not required, the focusing lens 10 is returned to the lens position of a focus at the tenth step Q10. It should be noted that the processing from the seventh to tenth steps Q7 to Q10 is, for example, represented by the fifth to eleventh steps P5 to P11 in FIG. 7.

With these processing, even if back and forth movement of the target object causes a scene change to be detected, the focusing operation is not repeated from the beginning, and a focus on the image is quickly established by the tracking of the focusing lens 10.

Figure 8:
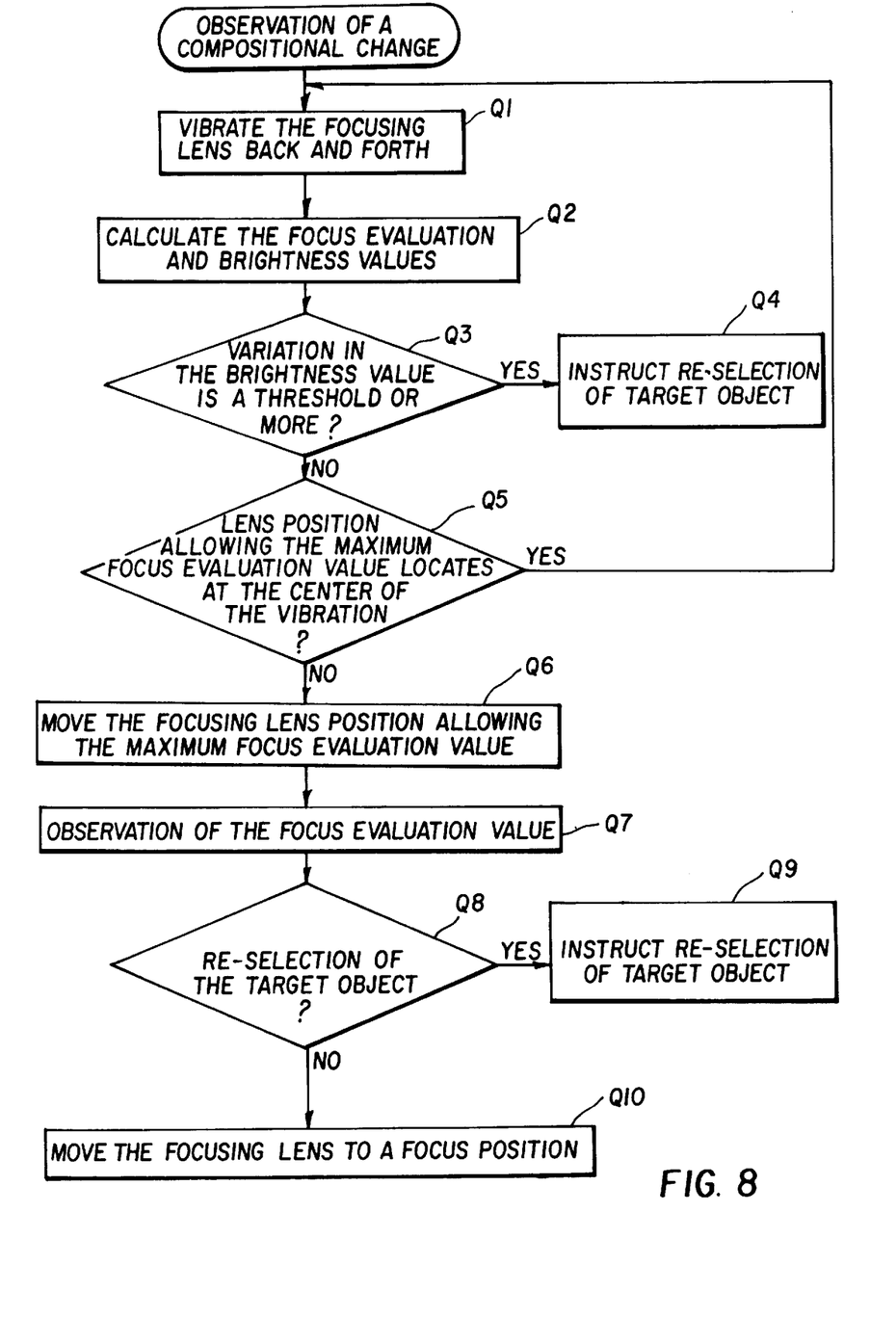
FIG. 8 is a flowchart for explaining a detecting operation for a compositional change.

The predetermined amount employed in determining an increase in the focus evaluation value during the processing in FIGS. 7 and 8, is determined based on the maximum focus evaluation value for each of the subdivision areas, which is obtained when calculating object distances for the respective subdivision areas. More specifically, when the overall region scanning operation is conducted at the first step S1 in FIG. 3, the maximum focus evaluation value is stored for each of the subdivision areas G(x,y). A greater maximum focus evaluation value allows a greater predetermined amount while a smaller focus evaluation value allows a smaller predetermined amount. As s result, an object movement can be detected depending upon an object contrast for the respective subdivision areas G(x,y).

Figure 9:
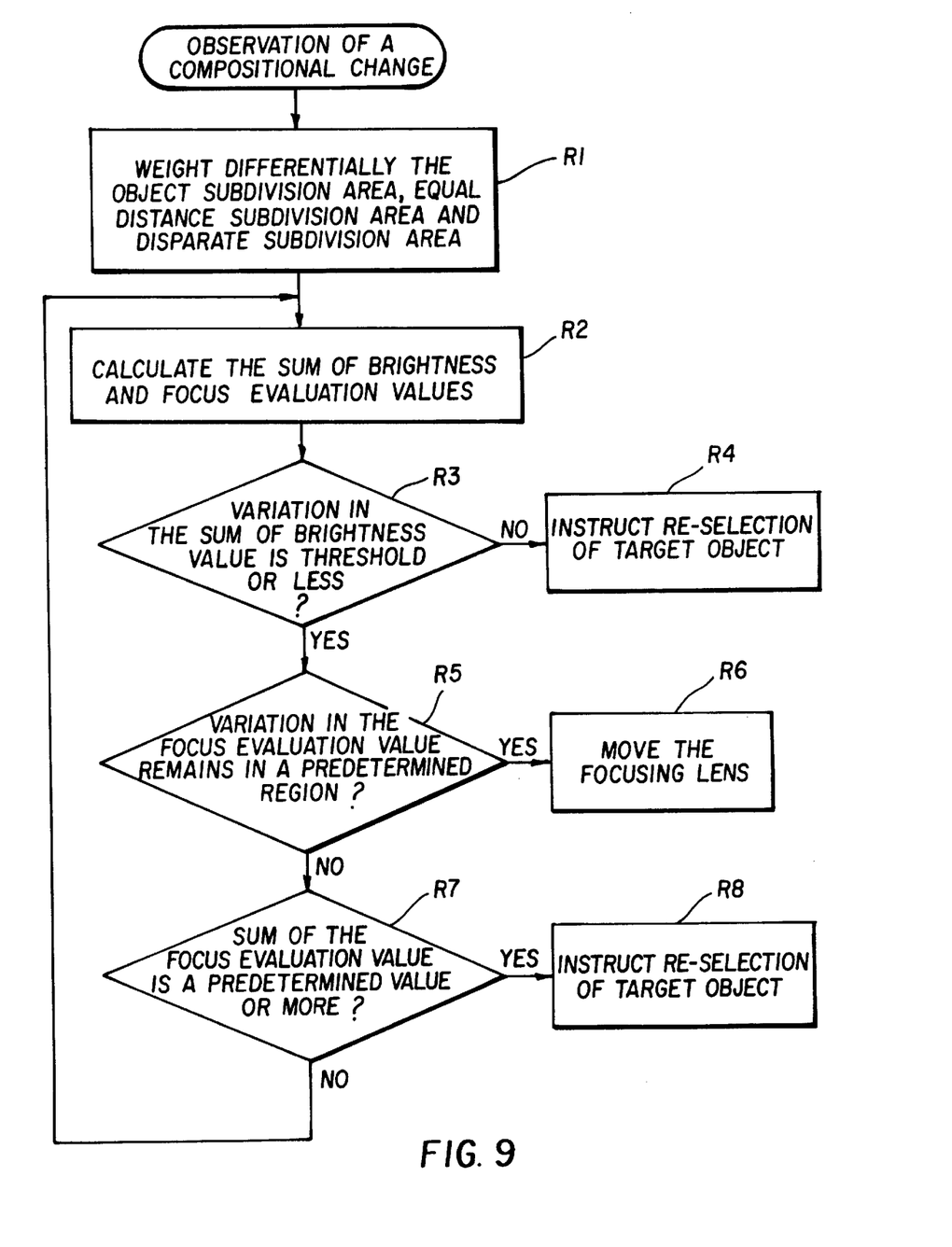
FIG. 9 is a flowchart for explaining a detecting operation for a compositional change according to another embodiment.
Figure 10:
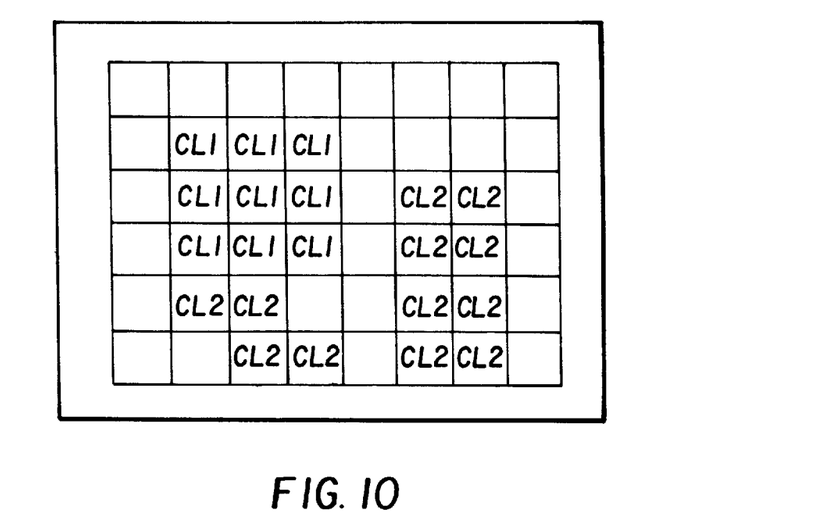
FIG. 10 illustrates the classification of the subdivision areas in the image.

FIG. 9 illustrates a detecting operation for compositional changes according to another embodiment. At the first step R1, the object subdivision area, an equal distance subdivision area having the object distance equal to that of the target object, and a disparate subdivision area having the object distance different from that of the target object are differentially weighted. In weighting, for example as shown in FIG. 10, a first weight can be allocated to the object subdivision area CL1, a second weight smaller than the first weight can be allocated to the equal distance subdivision area CL2, and a third weight smaller than the second weight can be allocated to the disparate subdivision area (blank).

At the second step R2, keeping the focusing lens 10 at the current lens position, sum of the brightness values and the focus evaluation values is calculated for total of the subdivision areas G(x,y) using the weights. If variation in the sum of the brightness value is determined to be more than a predetermined threshold at the third step R3, the target object is re-selected at the fourth step R4.

On the other hand, when variation in the sum of the brightness value is equal to or less than the predetermined threshold at the third step R3, variation in the focus evaluation value is observed for the object subdivision areas CL1 at the fifth step R5. If the variation in the focus evaluation value remains in a predetermined region, the focusing lens 10 is moved to the lens position allowing the maximum focus evaluation value at the sixth step R6. If the sum of the focus evaluation value is determined to be a predetermined value or more at the seventh step R7, the target object is re-selected at the eighth step R8. If the sum of the focus evaluation value is less than the predetermined value, the processing returns to the second step R2.

With the above detecting operation, a small scene change can be detected, in addition, capable of tracking the back and forth movement of the target object.

What is claimed is:

1. A method of automatic object detection comprising:
   obtaining an electrical signal corresponding to an illuminance of an image formed through a focusing lens with a photoelectric detector;
   dividing the image into a plurality of subdivision areas;
   calculating for each of the subdivision areas a focus evaluation value representative of high frequency component contained in the electrical signal;
   calculating an object distance for each of the subdivision areas based on the focus evaluation value so as to select a target object based on the object distance;
   focusing the target object by moving the focusing lens; and
   re-selecting the target object to be focused when a new object having an object distance smaller than the object distance of the target object is detected in a remote subdivision area having an object distance greater than the object distance of the target object during said focusing.

2. A method of automatic object detection defined in claim 1, wherein when the focusing lens is moved toward an infinite point so as to establish a lens position allowing a maximum focus evaluation value in an object subdivision area to which the target object belongs, detection of a reduction in the focus evaluation value in any of the remote subdivision area before a reduction in the focus evaluation value is detected in the object subdivision area causes the target object to be re-selected.

3. A method of automatic object detection defined in claim 1, wherein when the focusing lens is moved toward a nearest point so as to establish a lens position allowing a maximum focus evaluation value in an object subdivision area to which the target object belongs, detection of a reduction in the focus evaluation value in the object subdivision area and of an increase in the focus evaluation value by a predetermined amount or more in any of the remote subdivision area causes the target object to be re-selected.

4. A method of automatic object detection defined in claim 3, wherein said predetermined amount is determined on the basis of the maximum focus evaluation value obtained for each of the subdivision areas when calculating the object distance for the respective subdivision areas.

5. A method of automatic object detection defined in claim 2 or 3, further comprising:
   moving the focusing lens back and forth when the target object is focused;
   confirming the maximum focus evaluation value in the object subdivision area in response to movement of the focusing lens; and
   re-selecting the target object to be focused when a new object having an object distance smaller than the object distance of the target object is detected in any of the remote subdivision during the movement of the focusing lens.

6. A method of automatic object detection defined in claim 1, further comprising:
   weighting an object subdivision area to which a target object belongs, an equal distance subdivision area having the object distance equal to that of the target object, and a disparate subdivision area having the object distance different from that of the target object;
   calculating sum of brightness values and focus evaluation values for the respective subdivision areas while fixing a lens position;
   moving the focusing lens to a lens position allowing a maximum focus evaluation value when variation in the focus evaluation value for the object subdivision area remains in a predetermined region and variation in the sum of the brightness values is a predetermined threshold or less; and
   re-selecting the target object to be focused when variation in the sum of the brightness values is more than the predetermined threshold or when the sum of the focus evaluation values is a predetermined value or more.

* * * * *